United States Patent [19]

Klapwijk et al.

[11] 4,183,809
[45] Jan. 15, 1980

[54] PROCESS FOR REMOVING ORGANIC SUBSTANCES AND NITROGEN COMPOUNDS FROM WASTE WATER

[75] Inventors: Abraham Klapwijk, Wageningen; Gatze Lettinga, Ede, both of Netherlands

[73] Assignee: Stamicarbon, B.V., Geleen, Netherlands

[21] Appl. No.: 881,531

[22] Filed: Feb. 27, 1978

[30] Foreign Application Priority Data

Mar. 2, 1977 [NL] Netherlands .................. 7702236

[51] Int. Cl.² .......................................... C02C 1/04
[52] U.S. Cl. ........................................ 210/8; 210/9; 210/16; 210/DIG. 28
[58] Field of Search ............... 210/3, 4, 7, 8, 9, 16, 210/DIG. 28

[56] References Cited

U.S. PATENT DOCUMENTS

| | | | |
|---|---|---|---|
| 3,709,364 | 1/1973 | Savage | 210/DIG. 28 |
| 3,964,998 | 6/1976 | Barnard | 210/DIG. 28 |
| 4,011,156 | 3/1977 | Dubach et al. | 210/DIG. 28 |
| 4,043,936 | 8/1977 | Francis et al. | 210/DIG. 28 |
| 4,056,465 | 11/1977 | Spector | 210/DIG. 28 |

*Primary Examiner*—Thomas G. Wyse
*Attorney, Agent, or Firm*—Cushman, Darby & Cushman

[57] ABSTRACT

An improved process for the removal of organic substances and nitrogen compounds from waste water by means of micro-organisms, wherein waste water to be treated is passed continuously through a denitrification zone, effluent from the denitrification zone is passed into a nitrification zone, and at least a portion of the effluent from the nitrification zone is recycled back to the denitrification zone. A portion of the waste water to be treated is fed directly into the nitrification zone as well as to the denitrification zone.

12 Claims, 4 Drawing Figures

PROCESS FOR REMOVING ORGANIC SUBSTANCES AND NITROGEN COMPOUNDS FROM WASTE WATER

BACKGROUND OF THE INVENTION

The present invention relates to a process for the removal of organic substances and nitrogen compounds from waste water by means of micro-organisms, in which the waste water to be treated is passed continuously through a denitrification zone and then through a nitrification zone, part of the effluent from the nitrification zone is recycled to the denitrification zone, and the remainder is discharged.

A process of this type has been described in British Patent Specification No. 1,438,697. According to this patent specification it is known that domestic waste water can be freed from ammonium nitrogen by oxidation of this ammonium nitrogen to nitrate nitrogen by means of nitrifying microorganisms in biologically active sludge with molecular oxygen and subsequent reduction of the nitrate to molecular nitrogen by means of denitrifying microorganisms. Any nitrate nitrogen and nitrite nitrogen contained in the waste water will be removed at the same time.

Ammonia, ammonium ions and compounds that yield ammonia and ammonium ions in the course of the process are referred to as 'ammonium nitrogen' in this application, and nitrate ions and nitrite ions are referred to as 'nitrate nitrogen'.

The second stage of this known process, the denitrification, requires the use of an oxygen acceptor, which may be, e.g., an oxidizable organic substance, such as methanol. A useful oxidizable organic substance is usually present in the waste water to be treated, but only a small part of it can reach the second stage of the purifying process, as the organic substance has been reduced to a large extent in the nitrification stage by biological oxidation with atmospheric oxygen.

The British Patent Specification No. 1,438,697 proposes to reverse the order of treatment, and to subject the waste water first to a denitrification and then to a nitrification. The main advantage of this procedure is that the oxygen acceptor required for the denitrification is supplied by the oxidizable organic substances contained in the waste water to be treated. As the effluent from the nitrification zone is not free of nitrate, over 50% of the effluent is recycled to the denitrification zone to reduce the nitrate content of the liquid discharged.

In the denitrification zone, which is the first zone in the known process, nitrate nitrogen is reduced to molecular nitrogen and the organic impurities are oxidized.

This oxidation of the organic substances fed in needs a given amount of nitrate. When a comparatively small amount of nitrogen compounds are contained in the waste water, as is the case in domestic waste water, the supply of nitrate to the denitrification zone will be insufficient for the oxidation of the organic impurities fed in. This gives rise to processes, such as accumulation of organic material in the sludge causing less desirable growth of bacteria, and other undesirable anaerobic processes that may affect the sludge quality, notably the settling properties. This implies that the concentration of suspended sludge in the system is low and that a large reactor is required. An additional consequence is that the after-settlement must have considerably larger dimensions because the settling rate is lower, while this sludge may cause problems when subjected to further processing, such as drying.

SUMMARY OF THE INVENTION

It has now been found that this drawback can be obviated by feeding not all of the waste water to be treated to the denitrification zone, but part of it directly to the nitrification zone. The advantage of this measure is that the denitrification zone is loaded with a smaller amount of organic substances, while the nitrate feed to the denitrification zone, which is necessary for optimum removal of oxidizable organic substances, can be fully controlled.

DETAILED DESCRIPTION OF THE INVENTION

In the process according to the invention, the ratio of the waste-water flow passed into the denitrification zone to the waste-water flow passed into the nitrification zone, and also the magnitude of the part of the effluent from the nitrification zone that is returned to the denitrification zone, are preferably so controlled that the effluent from the denitrification zone always contains nitrate. This nitrate content is preferably at least 0.5 per liter, calculated as nitrogen. If this nitrate content is lower, or if no nitrate at all is present in the effluent from the denitrification zone, this will give rise to the problems as regards the sludge quality that have been referred to in the discussion of the present state of the art.

According to the invention, at least 25% of the effluent from the nitrification zone is returned to the denitrification zone; the exact amount, however, depends on the composition of the waste water.

The process according tot the invention is eminently suitable for the purification of waste water in which the ratio between the organic material present (expressed as COD determined by the dichromate method, in mg/l) and the total amount of nitrogen (mg/l) is at least 3. At lower values than 3, the known process does generally not present any problems as regards the sludge quality, so that then the process according to the invention will not offer any additional advantages.

At values of between about 3 and 7, the composition of the waste water determines if the known process can still be used. In the purification of waste water in which the organic component is mainly fusel oil or kindred substances, the process according to the invention will have to be used already at a value of about 3, while for some types of domestic waste water it will not be necessary until at 6–7. In most cases the known process can no longer be used at a ratio of over 7.

In the process according to the invention, the denitrification is preferably effected in a rising-flow reactor. A reactor of this type has been described in Water Research 9 (1975), pp. 95–101. The advantage of such a reactor is that a very high concentration of active sludge can be maintained in it, so that the reactor volume can be reduced considerably, while yet the required degree of purification is reached. This sludge has not been put on a support. In dependence on the type of waste water, sludge concentrations of 20–70 grams of solids per liter can be reached in this reactor, against 4 grams of solids per liter in a conventional plant.

The use of a rising-flow reactor requires that the purification be carried out by a two sludge-type system. But as, in a rising-flow reactor, a very well settling sludge is formed, which is not discharged from the denitrification zone, not even at surface velocities of 1-3 m/h (in dependence on the type of waste water), there are hardly any consequences for processing the sludge. What is required is that the recycle flow from the nitrification be freed of sludge before it is passed to the denitrification.

During the purification of waste water, sludge is also formed in the rising-flow reactor. This sludge may be discharged periodically or continuously from the reactor. As stated above, this sludge has excellent settling properties, so that no special settling installation is required for this sludge, but a simple liquid/solid separator, such as a filtration unit or a sieve bend, will be adequate.

A great advantage of this preferable embodiment of the process according to the invention is that simple means suffice to adapt an existing installation for biological purification, such as an oxidation ditch, an oxidation bed and the like, to changing demands or conditions, so that, besides organic material, nitrogen compounds can be removed from the waste water. To this end, only one comparatively small rising-flow reactor need be added to the existing installation.

It is preferably seen to that the liquid in a rising-flow reactor has a pH of 8 or more. As a result, phosphates and heavy metals, if any, precipitate and their content in the waste water is reduced. The pH in the denitrification zone can easily be controlled by adding an alkali to the recycle flow from the nitrification zone.

Use is preferably made of two or more series-connected rising-flow denitrification reactors, which enables the phosphate content to be reduced to a low concentration.

The liquid discharged from the nitrification reactor will always contain some nitrate. When the nitrate content is so high that direct discharge of the water is objectionable, this water can still be treated in an additional denitrification zone, which may be comparatively small, since only the net liquid flow need be processed in it. If the water fed to this denitrification reactor contains to little oxidizable organic material, an oxygen acceptor may be added, which, of course, must contain as little ammonium nitrogen as possible.

Another possibility of reducing the nitrogen content of the effluent from the nitrification reactor is treating this flow (i.e. the part that is not recycled to the denitrification zone after it has passed a sludge separator) in an alternately aerated and non-aerated reactor to which part of the crude waste water is supplied. In this case the oxygen acceptor may also contain ammonium nitrogen. This oxygen acceptor is preferably fed in during an anaerobic period. In order to reduce the ammonium-nitrogen content further, a zone with continuous aeration may be provided before the sludge separator of the alternately aerated and non-aerated reactor.

Still another possibility of reducing the nitrogen content of the effluent from the nitrification reactor is the alternating aeration and non-aeration of the nitrification reactor. This makes it possible also to effect the denitrification in this reaction. In the aerobic periode ammonium nitrogen is nitrified and in the anaerobic period nitrate is denitrified. If necessary, the ammonium concentration can be reduced as far as possible by arranging an aerated reactor between the alternately aerated and non-aerated reactor and the next sludge separator.

It is also possible to operate two alternately aerated and non-aerated nitrification reactors in parallel, one being aerated while the other is not. The crude waste water is preferably supplied to the non-aerated reactor and the denitrified water preferably to the aerated reactor.

If the waste water as such does not contain sufficient organic materials for the denitrification process, water with a comparatively higher C/N ration may be fed to the denitrication reactor. This may also be fed to the nitrification reactor or to both. As a result, thorough elimination of organic materials and nitrogen can be achieved under all conditions.

As stated above, it is to be preferred to use a rising-flow reactor with suspended sludge as the denitrification zone. Such preference does not relate to the nitrification zone. In this zone use may be made of any current nitrification system, such as suspended sludge, whether or not in a rising-fow reactor, or sludge on a support, e.g. an oxidation bed or a column with a packed bed.

DESCRIPTION OF THE DRAWINGS

The present invention will be elucidated with reference to the drawings in which some embodiments of the present invention are shown schematically.

In the schematic representation of the process in FIG. 1, part of the waste water to be purified (1) flows to the denitrification reactor (2). The denitrified water flows through line (3) to nitrification reactor (4), which is also fed with the remainder of the crude waste water (5). The nitrified water (6) flows to a sludge separator (7). The sludge separated off flows back (through 8) to the denitrification reactor (2) and the sludge-free water is discharged. Superfluous sludge is discharged through line (21). Through line (10), part of the nitrified water from nitrification reactor (4) is recycled to denitrification reactor (2). The ration between the waste-water flows (1) and (5) is controlled with reference to the nitrate content in line (3). If so desired, line (10) may be omitted. It must then be seen to that sufficient nitrate is returned through line (8) to meet the nitrate requirements in denitrification zone (2).

The process according to the invention will be further explained with reference to the following examples.

EXAMPLE 1

Figure 1:
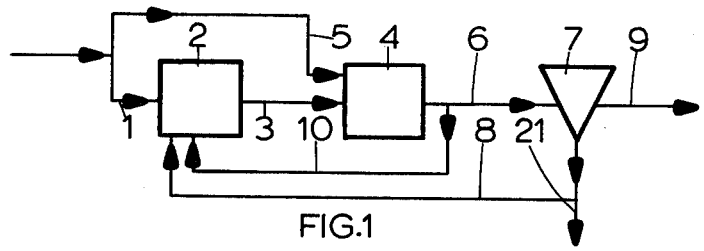
Figure 2:
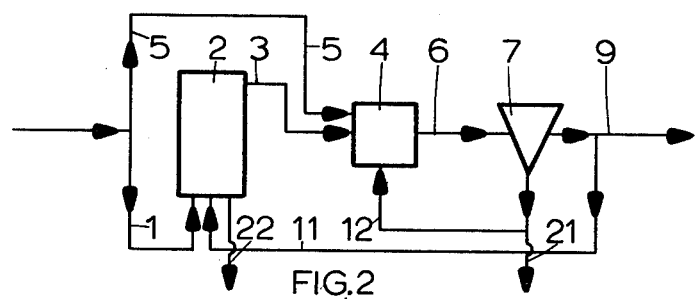
FIG. 2 elucidated the use of a rising-flow denitrification reactor (2). If so desired, a sludge separator may be incorporated in line (3), the sludge separated off being returned to reactor (2). Superfluous sludge is discharged from the reactor through line (22). The water discharged from nitrification reactor (4) through line (6) is freed of sludge in sludge separator (7), the sludge being returned to reactor (4) through line (12). Nitrified and sludge-free water is returned to denitrification reactor (2) through line (11).

Domestic waste water containing 55 mg of ammonium nitrogen (calculated as nitrogen), no nitrate nitrogen, and 500 mg/l of organic materials was supplied through conduit (1) to the installation according to the diagram of FIG. 2. The content of organic substances was calculated as chemical oxygen demand (COD; dichromate method). The sludge concentration in the rising-flow reactor (2) was 20 mg per liter. 40% of the waste water was supplied through line (1) and 60% of the waste water through line (5). The residence time of the waste water in the rising-flow reactor (2) was 1.2 hours. The denitrified water in line (3) contained 4.5 mg of ammonium nitrogen per liter, less than 1 mg/l of nitrate nitrogen, and 65 mg/l of COD.

The residence time of the crude waste water supplied directly through line (5) in nitrification reactor (4) was 12 hours. The water discharged through line (9) contained 11 mg/l of nitrate nitrogen, less than 1 mg/l of ammonium nitrogen, and 50 mg/l of COD. 80% of the effluent from sludge separator (7) was recycled to reactor (2) through line (11). The removal of organic material had an efficiency of 87% and that of nitrogen about 90%.

EXAMPLE 2

Figure 3:
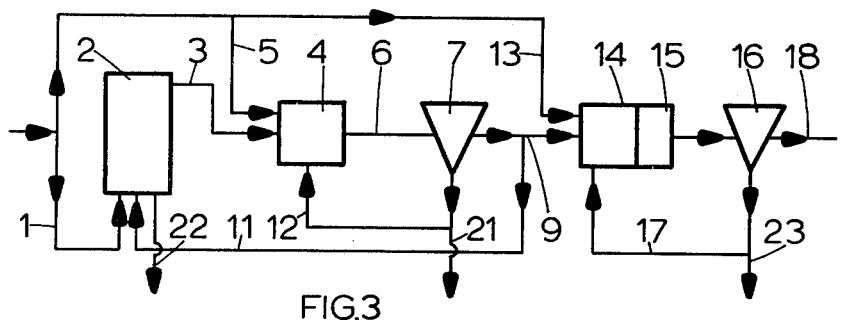
FIG. 3 shows an embodiment by means of which further reduction of the nitrate content of the water purified by the process of FIG. 2 can be achieved. Through line (9), nitrified water flows to an alternately aerated and non-aerated reactor (14). Part of the crude waste water is supplied through line (13). The sludge-water mixture flows from (14) to a continuously aerated zone (15) and then to sludge separator (16). The sludge is returned to reactor (14) through conduit (17), while superfluous sludge is removed through conduit (23).
Figure 4:
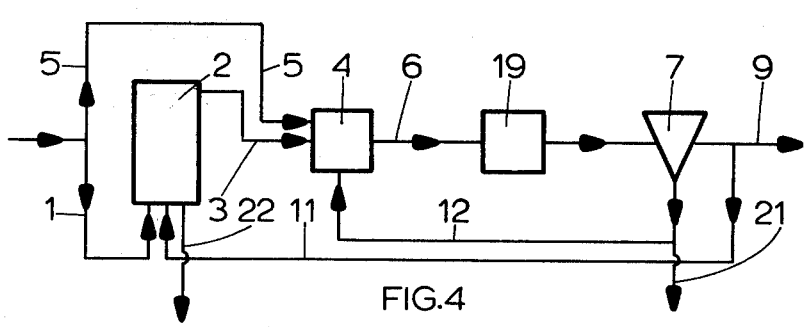
FIG. 4 shows a modified version of the process according to FIG. 2, in which the nitrification reactor (4) is aerated and non-aerated alternately. In order to reduce the ammonium-nitrogen content further, an additional aeration may be effected in reactor (19).

The process of example 1 was repeated, with the difference that an alternately aerated and non-aerated zone (14) is provided after the installation of FIG. 2 in accordance with the diagram of FIG. 3. This zone was fed with 10% of the crude waste water through line (13). here, too, 50% of the waste water flowed through line (5) and 40% through line (1). The discharge line (18) contained 50 mg/l of COD, 2 mg/l of nitrate nitrogen, and 1 mg/l of ammonium nitrogen. The efficiency of the removal of organic substances was 90% and that of nitrogen 95%.

EXAMPLE 3 AND COMPARATIVE EXAMPLE

The process according to example 1 was repeated only to examine the settling properties of the sludge in the denitrification zone. This was done by means of the sludge volume index (SVI), which is the volume (in ml) taken up by an aqueous sludge suspension containing 1 gram of solids after it has settled for 30 minutes.

When use was made of the process according to the invention, i.e. when the liquid to be purified was so distributed over denitrification and nitrification that the denitrification effluent contained nitrate, the SVI ranged between 35 and 90 ml/g of solids. When all the water to be purified is fed to the denitrification zone, i.e. when the conventional process known in the art is used, the SVI was about 215 ml/g of solids, which necessitated additional settling.

We claim:

1. In a process for the removal of organic substances and nitrogen compounds from waste water by means of micro-organisms wherein:
   waste water to be treated is passed continuously through a denitrification zone;
   effluent from said denitrification zone is passed through a nitrification zone; and
   at least a portion of the effluent from the nitrification zone is recycled to the denitrification zone and the remaining portion is discharged,
   the improvement wherein a portion of said waste water to be treated is fed directly to said nitrification zone.

2. The process of claim 1 wherein the ratio of the amount of waste water flow passed into the denitrification zone to the amount of the waste water flow passed directly to the nitrification zone, as well as the amount of effluent from the nitrification zone recycled to the denitrification zone, are so controlled that the effluent from the denitrification zone contains nitrate.

3. The process of claim 2 wherein the nitrate content of the effluent from the denitrification zone is at least 0.5 mg per liter.

4. The process of claim 1 or 2 wherein at least 25% of the effluent from the nitrification zone is returned to the denitrification zone.

5. The process of claim 1 wherein the denitrification is effected in at least one rising-flow reactor.

6. The process of claim 5 wherein the denitrification is effected in at least two series-connected rising-flow reactors.

7. The process of claim 5 wherein pH of the liquid in said at least one rising-flow reactor is controlled at 8.0 or higher.

8. The process of claim 1 or 5 wherein said remaining portion of nitrification zone effluent is discharged into further processing steps wherein it is substantially freed of sludge and thereafter treated in an alternately aerated and non-aerated reactor to which a further portion of said waste water to be treated is fed.

9. The process of claim 1 or 5 wherein the nitrification zone is alternately aerated and non-aerated.

10. The process of claim 9 wherein the nitrification zone consists of two nitrification reactors connected in parallel, and each such reactor is alternately aerated and non-aerated in a manner such that one is aerated while the other is not.

11. The process of claim 10 wherein said portion of waste water to be treated is fed directly to the reactor not being aerated.

12. The process of claim 1 or 5 wherein said remaining portion of nitrification zone effluent is subjected to an additional aeration step after which it is substantially freed of sludge.

* * * * *